US012577362B2

(12) United States Patent
Zhang

(10) Patent No.: US 12,577,362 B2
(45) Date of Patent: Mar. 17, 2026

(54) FOAMABLE COMPOSITION AND ARTICLE

(71) Applicants: Yahong Zhang, Shanghai (CN); Dow Global Technologies LLC, Midland, MI (US)

(72) Inventor: Yahong Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 741 days.

(21) Appl. No.: 17/920,842

(22) PCT Filed: Apr. 23, 2020

(86) PCT No.: PCT/CN2020/086342
§ 371 (c)(1),
(2) Date: Oct. 24, 2022

(87) PCT Pub. No.: WO2021/212402
PCT Pub. Date: Oct. 28, 2021

(65) Prior Publication Data
US 2025/0340710 A1     Nov. 6, 2025

(51) Int. Cl.
| | |
|---|---|
| C08J 9/08 | (2006.01) |
| C08L 23/08 | (2006.01) |
| C08L 23/14 | (2006.01) |
| C08L 23/16 | (2006.01) |

(52) U.S. Cl.
CPC ................. C08J 9/08 (2013.01); C08L 23/08 (2013.01); C08L 23/14 (2013.01); C08L 23/16 (2013.01); *C08J 2203/02* (2013.01); *C08J 2323/16* (2013.01); *C08J 2423/08* (2013.01); *C08J 2423/16* (2013.01)

(58) Field of Classification Search
CPC ........................................................ C08J 9/08
See application file for complete search history.

(56) References Cited

U.S. PATENT DOCUMENTS

| | | |
|---|---|---|
| 4,769,397 A | 9/1988 | Lapierre et al. |
| 4,840,973 A | 6/1989 | Kuwabara et al. |
| 6,943,215 B2 | 9/2005 | Stevens et al. |
| 7,109,269 B2 | 9/2006 | Stevens et al. |
| 9,505,894 B2 | 11/2016 | Hotta et al. |
| 11,078,353 B2 * | 8/2021 | Zhang ..................... C08L 23/14 |
| 11,976,186 B2 * | 5/2024 | Kulshreshtha .......... B32B 5/022 |
| 2004/0092631 A1 * | 5/2004 | Joseph .................... C08L 23/10 |
| | | 524/394 |
| 2008/0262116 A1 | 10/2008 | Simpson et al. |
| 2011/0206922 A1 * | 8/2011 | Kawamura ........... C08L 23/142 |
| | | 521/134 |
| 2014/0288225 A1 * | 9/2014 | Shipley ................. C08L 53/025 |
| | | 524/451 |
| 2017/0247522 A1 | 8/2017 | Kalfus et al. |

FOREIGN PATENT DOCUMENTS

| | | |
|---|---|---|
| CN | 103788480 A | 5/2014 |
| EP | 0543412 A1 | 5/1993 |
| JP | 2002-283382 A | 10/2002 |
| JP | 2017-179251 A | 10/2017 |
| KR | 10-2013-0053648 A | 5/2013 |
| KR | 20180031500 A | 3/2018 |
| KR | 20200039300 A | 4/2020 |
| WO | 2016/005301 A1 | 1/2016 |
| WO | 2019/002294 A1 | 1/2019 |

OTHER PUBLICATIONS

WO 2019/238943 (Year: 2019).*
WO2018/222437 (Year: 2018).*
Versify 4301 flyer (Year: 2018).*
Engage 8200 flyer (Year: 2011).*
Engage 8100 flyer (Year: 2011).*

* cited by examiner

*Primary Examiner* — Irina Krylova

(74) *Attorney, Agent, or Firm* — Boyle Fredrickson S.C.

(57)     ABSTRACT

The present disclosure is directed to a foamable composition and a foam article formed from the foamable composition. In an embodiment, the foamable composition includes from 50 wt % to 65 wt % of a propylene impact copolymer, from 10 wt % to 18 wt % of an ethylene elastomer with a density from 0.860 g/cc to 0.89 g/cc and a melt index from 1 g/10 min to 50 g/10 min. from 10 wt % to 18 wt % of a propylene elastomer with a density from 0.860 g/cc to 0.890 g/cc and a melt flow rate from 1 g/10 min to 50 g/10 min, from 0 wt % to 15 wt % of a filler, and from 0.5 wt % to 5.0 wt % blowing agent. The foam article formed from the foamable composition has a density from 0.800 g/cc to 0.850 g/cc, and a notched Izod impact strength at 23° C. from greater than 11 KJ/m$^2$ to 27 KJ/m$^2$.

5 Claims, 1 Drawing Sheet

The schematic diagram for the 2 times open mold molding method
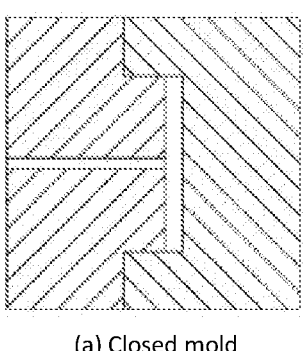 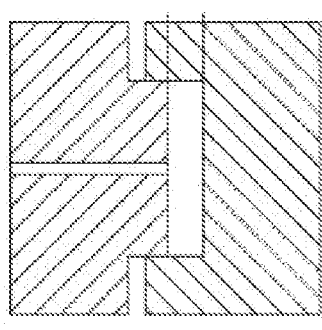 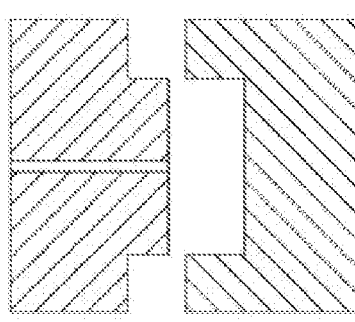
(a) Closed mold        (b) slight open mold        (c) final open mold

FOAMABLE COMPOSITION AND ARTICLE

BACKGROUND

Thermoplastic polyolefin (TPO) is a major component used in automotive interior parts. Examples of automotive interior parts that utilize TPO include instrument panels, door panels, pillars, and bumpers.

An on-going objective in the automotive industry is the "light-weighting" of car bodies in an effort to achieve higher gas mileage and concomitantly lower carbon dioxide emissions. Replacement of conventional TPO automotive interior parts with foam parts is one possible approach for light-weighting car bodies. However, incumbent TPO formulations used for automotive interior parts do not translate well into foam parts. Incumbent TPO formulations, when foamed, fail to achieve the balance of toughness (as measured by notched Izod impact strength) and stiffness (as measured by flexural modulus) required for automotive interior part applications.

The art recognizes the need for TPO formulations that when formed into a foam article maintain the same, or better, balance of toughness and stiffness as non-foamed incumbent TPO formulations utilized for automotive interior parts.

SUMMARY

The present disclosure is directed to a foamable composition and a foam article formed from the foamable composition. In an embodiment, the foamable composition includes from 50 wt % to 65 wt % of a propylene impact copolymer, from 10 wt % to 18 wt % of an ethylene elastomer with a density from 0.860 g/cc to 0.89 g/cc and a melt index from 1 g/10 min to 50 g/10 min, from 10 wt % to 18 wt % of a propylene elastomer with a density from 0.860 g/cc to 0.890 g/cc and a melt flow rate from 1 g/10 min to 50 g/10 min, from 0 wt % to 15 wt % of a filler, and from 0.5 wt % to 5.0 wt % blowing agent.

The present disclosure also provides a foam article formed from the foamable composition. The foam article formed from the foamable composition has a density from 0.800 g/cc to 0.850 g/cc, and a notched Izod impact strength at 23° C. from greater than 11 KJ/m² to 27 KJ/m².

BRIEF DESCRIPTION OF THE DRAWINGS

FIGS. 1(a), 1(b), and 1(c) are a schematic representation of a "two times" mold opening operation in accordance with an embodiment of the present disclosure.

DEFINITIONS

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on weight. For purposes of United States patent practice, the contents of any patent, patent application, or publication referenced herein are hereby incorporated by reference in their entirety (or the equivalent US version thereof is so incorporated by reference).

The numerical ranges disclosed herein include all values from, and including, the lower value and the upper value.

For ranges containing explicit values (e.g., a range from 1, or 2, or 3 to 5, or 6, or 7) any subrange between any two explicit values is included (e.g., the range 1-7 above includes subranges from 1 to 2; from 2 to 6; from 5 to 7; from 3 to 7; from 5 to 6; etc.).

Unless stated to the contrary, implicit from the context, or customary in the art, all parts and percentages are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Elastomer" and like terms refer to a rubber-like polymer that can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72.

An "ethylene elastomer" and like terms refer to an elastomer composed of an ethylene-based polymer.

An "ethylene-based polymer," as used herein is a polymer that contains more than 50 weight percent polymerized ethylene monomer (based on the total amount of polymerizable monomers) and, optionally, may contain at least one comonomer.

The term "foam," or "foam article," as used herein, is a structure constructed from a polymer; the structure comprises a plurality of discrete gas pockets, or foam cells, completely surrounded by polymer. The term "foam cell," or "cell," as used herein, is a discrete space within the foam composition. The foam cell is separated, or otherwise is defined, by membrane walls composed of the polymer of the foam composition.

An "olefin-based polymer," or "polyolefin," as used herein is a polymer that contains more than 50 weight percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based elastomer" (or "PBE") includes reactor grade propylene-based polymer having heat of fusion less than about 100 J/g and MWD less than 3.5. The PBEs generally have a heat of fusion less than about 40 J/g. PBEs have a weight percent ethylene in the range from 3 to 15 wt %.

A "propylene-based polymer" is a polymer that contains more than 50 weight percent polymerized propylene monomer (based on the total amount of polymerizable monomers) and, optionally, may contain at least one comonomer.

Test Methods

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to –40° C. at a 10° C./minute cooling rate and held isothermal at –40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to –20° C. The heat curve is analyzed by setting baseline endpoints from –20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=$((H_f/292 \text{ J/g}) \times 100$ The heat of fusion ($H_f$) (also known as melt enthalpy) and the peak melting temperature are reported from the second heat curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Glass transition temperature, Tg, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Density of foam article is measured in accordance with ASTM D-1622-88 with results reported in kilograms per cubic meter ($kg/m^3$) or grams per cubic centimeter (g/cc) at 25° C.

Density of polymer is measured in accordance with ASTM D792 with results reported in g/cc at 25° C.

Flexural modulus and flexural yield strength are measured in accordance with ASTM 0790-970. The result is recorded in megaPascal, or MPa.

Melt flow rate (or MFR) measurement (for the propylene-based elastomers) is performed according to ASTM D1238, Condition 230° C./2.16 kilogram (kg) weight. As with the melt index, the melt flow rate is inversely proportional to the molecular weight of the polymer. Thus, the higher the molecular weight, the lower the melt flow rate, although the relationship is not linear.

Melt index (MI or I2) (for ethylene-based elastomers) is measured in accordance with ASTM D 1238, Condition 190° C./2.16 kg with results reported in grams per 10 minutes (g/10 min).

Notched Izod impact strength is measured in accordance with ISO 180 at 23° C. and at –30° C., with results reported in kilojoules per square meter ($KJ/m^2$).

Tensile strength. The present compositions can be characterized by their tensile strength at break (in MPa) and elongation at break (%). Tensile strength and tensile elongation are measured in accordance with the ASTM D638 testing procedure on compression molded samples prepared according to ASTM D4703. Elongation at break, or elongation to break, is the strain on a sample when it breaks, expressed as a percent.

The term "pore size," as used herein, is a measure of the dimensions of foam cells. The pore size is determined by dividing the average cell count by the specified length and multiplying the result by 1.62, which is an established geometric factor for this purpose, as disclosed in *Cellular Polymers*, Vol. 21, No. 3, 165-194 (2002). Cell size (i.e., average cell size), is measured in accordance with ASTM D3576-77, and is reported in microns.

Vicat softening point is measured in accordance with ASTM D 1525 with results reported in degrees Celsius (° C.).

DETAILED DESCRIPTION

The present disclosure provides a foamable composition. The foamable composition includes from 50 wt % to 65 wt % of a propylene impact copolymer and from 10 wt % to 18 wt % of an ethylene elastomer. The ethylene elastomer has a density from 0.860 g/cc to 0.890 g/cc and a melt index from 1 g/10 min to 50 g/10 min. The foamable composition also includes from 10 wt % to 18 wt % of a propylene elastomer. The propylene elastomer has a density from 0.860 g/cc to 0.890 g/cc and a melt flow rate from 1 g/10 min to 50 g/10 min. The foamable composition further includes from 0 wt % to 15 wt % of a filler, and from 0.5 wt % to 5.0 wt % blowing agent.

The term "foamable composition," as used herein, is a mixture of the (i) propylene impact copolymer, (ii) ethylene elastomer, (iii) propylene elastomer, (iv) optional filler, and (v) blowing agent under the extrusion conditions.

The foamable composition includes a propylene impact copolymer. The propylene impact copolymer is a two-phase polymer wherein a rubber phase (or a discontinuous phase) of discrete domains of ethylene/propylene copolymer is dispersed throughout a matrix phase (or a continuous phase) of propylene homopolymer. The propylene impact copolymer contains from 5 wt % to 15 wt %, or from 7 wt % to 13 wt %, or from 8 wt % to 11 wt % ethylene/propylene rubber phase, based on the total weight of the propylene impact copolymer.

In an embodiment, the propylene impact copolymer has one, some, or all of the following properties:

(i) from 7 wt % to 13 wt %, or from 8 wt % to 11 wt % ethylene/propylene rubber phase; and/or (ii) a density from 0.89 g/cc to 0.91 g/cc; and/or (iii) a MFR from 50 g/10 min to 70 g/10 min, or from 55 g/10 min to 65 g/10 min; and/or (iv) a Vicat softening point from 140° C. to 170° C., or from 150° C. to 160° C.

An nonlimiting example of a suitable propylene impact copolymer is BX 3900 available from SK Global Chemical Company.

The foamable composition includes an ethylene elastomer. The ethylene elastomer is an ethylene/α-olefin copolymer that is an ethylene/propylene copolymer or an ethylene/$C_4$-$C_8$ α-olefin copolymer. In an embodiment, the ethylene elastomer is an ethylene/α-olefin copolymer that is an ethylene/$C_4$-$C_8$ α-olefin copolymer. The ethylene/$C_4$-$C_8$ α-olefin copolymer is composed of, or otherwise consists of, ethylene and one copolymerizable $C_4$-$C_8$ α-olefin comonomer in polymerized form. The $C_4$-$C_8$α-olefin comonomer is selected from butene, hexene, and octene. The ethylene/$C_4$-$C_8$ α-olefin copolymer has a density from 0.860 g/cc to 0.89 g/cc, or from 0.860 g/cc to 0.880 g/cc; a melt index from 1 g/10 min to 50 g/10 min, or from 3 g/10 min to 20 g/10 min, or from 4 g/10 min to 15 g/10 min; and a melting point (Tm) from 40° C. to 60° C., or from 50° C. to 60° C.

In an embodiment, the ethylene elastomer is an ethylene/octene copolymer having one, some, or all of the following properties:

(i) a density from 0.860 g/cc to 0.890 g/cc, or from 0.860 g/cc to 0.880 g/cc; and/or (ii) a melt index from 3 g/10 min to 20 g/10 min, or from 4 g/10 min to 15 g/10 min; and/or (iii) a Tm from 50° C. to 60° C.; and/or (iv) a Tg from −60° C. to −50° C.; and/or (v) a Vicat softening point from 30° C. to 40° C.

Nonlimiting examples of suitable ethylene elastomer include ENGAGE 8137 and ENGAGE 8200 available from Dow, Inc.

The foamable composition includes a propylene elastomer. The propylene elastomer is an propylene/α-olefin copolymer that is a propylene/ethylene copolymer. The propylene/ethylene copolymer is composed of, or otherwise consists of, propylene and ethylene comonomer in polymerized form. The propylene/ethylene copolymer contains from 3 wt % to 15 wt %, or from 5 wt % to 15 wt %, or from 7 wt % to 13 wt % units derived from ethylene, based on the total weight of the propylene/ethylene copolymer. The propylene/ethylene copolymer has a density from 0.860 g/cc to 0.890 g/cc, or from 0.860 g/cc to 0.880 g/cc; a MFR from 1 g/10 min to 50 g/10 min, or from 5 g/10 to 30 g/10, or from 15 g/10 min to 30 g/10 min; and a Tm from 60° C. to 90° C. or from 62° C. to 87° C.

In an embodiment, the propylene elastomer is a propylene/ethylene copolymer with from 7 wt % to 13 wt % units derived from ethylene, based on the total weight of the propylene/ethylene copolymer, and the propylene/ethylene copolymer has one, some, or all of the following properties:

(i) a density from 0.860 g/cc to 0.890 g/cc, or from 0.860 g/cc to 0.880 g/cc; and/or (ii) a MFR from 15 g/10 min to 30 g/10 min; and/or (iii) a Tm from 60° C. to 90° C. or from 62° C. to 87° C.; and/or (iv) a Vicat softening point from 45° C. to 55° C.

Nonlimiting examples of suitable propylene elastomer include VERSIFY 4200 and VERSIFY 4301 available from Dow, Inc.

The present foamable composition may include an optional filler. When the filler is present the in the foamable composition the filler is selected from talc, calcium carbonate, mica, glass fibers, and combinations thereof. In an embodiment, the foamable composition contains filler in an amount from 0 wt %, or greater than 0 wt %, or 1 wt %, or 5 wt %, to 10 wt %, or 20 wt %, or 30 wt %.

In an embodiment, the filler is talc and is present in an amount from greater than 0 wt % to 15 wt %, or from 5 wt % to 15 wt %, or from 8 wt % to 12 wt %, based on total weight of the foamable composition.

The foamable composition includes a blowing agent. The blowing agent can be a physical blowing agent or a chemical blowing agent. The term "physical blowing agent," as used herein, is a compound, or composition, that (i) is dissolved in the polymer composition (or in a supercritical phase) under the extrusion conditions, by virtue of being sufficiently soluble in the foamable composition at those conditions and (ii) comes out of solution under conditions (temperature, pressure) encountered during formation of a foam composition, as the foamable composition exits the extrusion die. The physical blowing agent is added to the polymer composition under the extrusion conditions to form a foamable composition. Nonlimiting examples of suitable physical blowing agents include $N_2$ gas and/or $CO_2$ gas.

In an embodiment, the blowing agent is a chemical blowing agent. The chemical blowing agent generates one or more physical blowing agents, by thermal decomposition in the foaming process. Chemical blowing agents include (but are not limited to) sodium bicarbonate, sodium borohydride, azodicarbonamide, azodiisobutyro-nitrile, barium azodicarboxylate, N,N'-dimethyl-N,N'-dinitrosoterephthalamide, and benzenesulfonhydrazide, 4,4-oxybenzene sulfonyl semicarbazide, and p-toluene sulfonyl semicarbazide, trihydrazino triazine and mixtures such as those of citric acid and sodium bicarbonate.

In an embodiment, the chemical blowing agent is selected from sodium bicarbonate and sodium borohydride.

The foamable composition may include one or more optional additives. When the additive is present, nonlimiting examples of suitable additives include pigments (carbon black, titanium dioxide), antioxidants, acid scavengers, ultraviolet light stabilizer (e.g., hindered amine light stabilizer such as N,N'-bisformyl-N,N'-bis(2,2,6,6-tetramethyl-4-piperidinyl)-hexamethylenediamine), flame retardants, processing aids, extrusion aids, antistatic agents, and combinations thereof.

In an embodiment, the present foamable composition includes an antioxidant. Nonlimiting examples of suitable antioxidant include bis(4-(1-methyl-1-phenylethyl)phenyl)

7 amine; 2,2'-thiobis(2-t-butyl-5-methylphenol; 2,2'-thiobis (6-t-butyl-4-methylphenol; tris [(4-tert-butyl-3-hydroxy-2, 6-dimethylphenyl)methyl]-1,3,5-triazine-2,4,6-trione; pentaerythritol tetrakis(3-(3,5-bis(1,1-dimethylethyl)-4-hy-droxyphenyl) propionate; distearyl thiodipropionate ("DSTDP"); dilauryl thiodipropionate; or 2',3-bis[[3-[3,5-di-tert-butyl-4-hydroxyphenyl]propionyl]] propionohydraz-ide). The antioxidant is present in an amount from 0.1 wt % to 0.5 wt % based on the total weight of the foamable composition.

In an embodiment, the foamable composition includes (A) from 50 wt % to 65 wt % of the propylene impact copolymer;

(B) from 10 wt % to 18 wt % of the ethylene elastomer, the ethylene elastomer having a density from 0.860 g/cc to 0.890 g/cc and a melt index from 1 g/10 min to 50 g/10;

(C) from 10 wt % to 18 wt % of the propylene elastomer, the propylene elastomer has a density from 0.860 g/cc to 0.890 g/cc, a MFR from 1 g/10 min to 50 g/10 min;

(D) from 0 wt %, or 1 wt % to 15 wt % of the filler; and (E) from 1.0 wt % to 5.0 wt % of the blowing agent, the sum of components (A)-(E) amount to 100 wt % of the foamable composition.

In an embodiment, the foamable composition includes (A) from 52 wt % to 60 wt % of the propylene impact copolymer, the propylene impact copolymer having (i) from 7 wt % to 13 wt % ethylene/propylene rubber phase; and/or (ii) a density from 0.89 g/cc to 0.91 g/cc; and/or (iii) a MFR from 50 g/10 min to 70 g/10 min; and/or (iv) a Vicat softening point from 140° C. to 170° C.;

(B) from 12 wt % to 18 wt % of the ethylene elastomer, the ethylene elastomer having (i) a density from 0.860 g/cc to 0.89 g/cc; and/or (ii) a MI from 3 g/10 min to 20 g/10 min; and/or (iii) a Tm from 50° C. to 60° C.; and/or (iv) Tg from −60° C. to −50° C.; and/or (v) a Vicat softening point from 30° C. to 40° C.;

(C) from 12 wt % to 18 wt % of the propylene elastomer, the propylene elastomer having (i) a density from 0.860 g/cc to 0.870 g/cc; and/or (ii) a MFR from 15 g/10 min to 30 g/10 min; and/or (iii) a Tm from 60° C. to 90° C.; and/or (iv) a Vicat softening point from 45° C. to 55° C.;

(D) from 5 wt % to 15 wt % of the filler;

(E) from 1.0 wt % to 5.0 wt % of the blowing agent; and (F) from 0.1 wt % to 0.5 wt % antioxidant, the sum of components (A)-(F) amount to 100 wt % of the foamable composition.

In an embodiment, the foamable composition includes (A) from 55 wt % to 60 wt % of the propylene impact copolymer, the propylene impact copolymer having (i) from 7 wt % to 13 wt % ethylene/propylene rubber phase; and/or (ii) a density from 0.89 g/cc to 0.91 g/cc; and/or (iii) a MFR from 50 g/10 min to 70 g/10 min; and/or (iv) a Vicat softening point from 140° C. to 170° C.;

(B) from 12 wt % to 18 wt % of the ethylene elastomer, the ethylene elastomer having (i) a density from 0.860 g/cc to 0.89 g/cc; and/or (ii) a MI from 3 g/10 min to 20 g/10 min; and/or (iii) a Tm from 50° C. to 60° C.; and/or (iv) Tg from −60° C. to −50° C.; and/or (v) a Vicat softening point from 30° C. to 40° C.;

(C) from 12 wt % to 18 wt % of the propylene elastomer, the propylene elastomer having (i) a density from 0.860 g/cc to 0.870 g/cc; and/or (ii) a MFR from 15 g/10 min to 30 g/10 min; and/or (iii) a Tm from 60° C. to 90° C.; and/or (iv) a Vicat softening point from 45° C. to 55° C.;

(D) from 8 wt % to 12 wt % of the filler;

(E) from 1.0 wt % to 5.0 wt % of the blowing agent; and (F) from 0.1 wt % to 0.5 wt % antioxidant, the sum of components (A)-(F) amount to 100 wt % of the foamable composition.

The foamable composition is free of, or otherwise excludes a silane and/or a crosslinking agent.

The foamable composition (the (i) propylene impact copolymer, (ii) ethylene elastomer, (iii) propylene elastomer, (iv) optional filler, (v) blowing agent, and (vi) optional additive) is subjected to a foaming process whereby the foamable composition is melt-mixed in an extruder to melt the polymers and to dissolve the blowing agent into the melt-mix. The melt-mix is subsequently injected into an injection mold. After injection into the mold, the volume of the mold is rapidly increased, thereby rapidly dropping the pressure within the mold interior, which triggers expansion of the melt-mix into a foam that expands and fills the increased volume of the mold interior, thereby forming a foam article. The foam article is composed of, or otherwise is formed from, the foamable composition.

The present disclosure provides a foam article produced from the present foamable composition. In an embodiment, the foam article includes (A) from 50 wt % to 65 wt % of the propylene impact copolymer;

(B) from 10 wt % to 18 wt % of the ethylene elastomer, the ethylene elastomer having a density from 0.860 g/cc to 0.890 g/cc and a melt index from 1 g/10 min to 50 g/10;

(C) from 10 wt % to 18 wt % of the propylene elastomer, the propylene elastomer has a density from 0.860 g/cc to 0.890 g/cc, MFR from 1 g/10 min to 50 g/10 min;

(D) from 0 wt %, or 1 wt % to 15 wt % of the filler; and the sum of components (A)-(D) amount to 100 wt % of the foam article, and the foam article has one, some, or all of the following properties:

(1) a density from 0.800 g/cc to 0.850 g/cc; and/or (2) a notched Izod impact strength at 23° C. from greater than 11 KJ/m$^2$ to 27 KJ/m$^2$; and/or (3) is crosslink-free (no gel content); and/or (4) is void of, or otherwise excludes, silane or silicon (hereafter Foam1).

In an embodiment, the foam article includes (A) from 52 wt % to 60 wt % of the propylene impact copolymer, the propylene impact copolymer having (i) from 7 wt % to 13 wt % ethylene/propylene rubber phase; and/or (ii) a density from 0.89 g/cc to 0.91 g/cc; and/or (iii) a MFR from 50 g/10 min to 70 g/10 min; and/or (iv) a Vicat softening point from 140° C. to 170° C.;

(B) from 12 wt % to 18 wt % of the ethylene elastomer, the ethylene elastomer having (i) a density from 0.860 g/cc to 0.890 g/cc, or from 0.860 g/cc to 0.880 g/cc; and/or (ii) a MI from 3 g/10 min to 20 g/10 min; and/or (iii) a Tm from 50° C. to 60° C.; and/or (iv) Tg from −60° C. to −50° C.; and/or (v) a Vicat softening point from 30° C. to 40° C.;

(C) from 12 wt % to 18 wt % of the propylene elastomer, the propylene elastomer having (i) a density from 0.860 g/cc to 0.890 g/cc or from 0.860 g/cc to 0.880 g/cc; and/or (ii) a MFR from 15 g/10 min to 30 g/10 min; and/or (iii) a Tm from 60° C. to 90° C.; and/or (iv) a Vicat softening point from 45° C. to 55° C.;

(D) from 5 wt % to 15 wt % of the filler; and (E) from 0.1 wt % to 0.5 wt % antioxidant, the sum of components (A)-(E) amount to 100 wt % of the foam article and the foam article has one, some, or all of the following properties:

(1) a density from 0.810 g/cc to 0.850 g/cc, or from 0.810 g/cc to 0.840 g/cc; and/or (2) a notched Izod impact strength at 23° C. from greater than 11 KJ/m$^2$ to 27 KJ/m$^2$; and/or (3) a notched Izod impact strength at −30° C. from 2.5 to 4.0 KJ/m$^2$; and/or (4) a flexural modulus from greater than 600 MPa to less than 1100 MPa; and/or (5) is crosslink-free (no gel content); and/or (6) is void of, or otherwise excludes, silane or silicon (hereafter Foam2).

In an embodiment, the foam article includes (A) from 55 wt % to 60 wt % of the propylene impact copolymer, the propylene impact copolymer having (i) from 7 wt % to 13 wt % ethylene/propylene rubber phase; and/or (ii) a density from 0.89 g/cc to 0.91 g/cc; and/or (iii) a MFR from 50 g/10 min to 70 g/10 min; and/or (iv) a Vicat softening point from 140° C. to 170° C.;

(B) from 12 wt % to 18 wt % of the ethylene elastomer, the ethylene elastomer having (i) a density from 0.860 g/cc to 0.890 g/cc, or from 0.860 g/cc to 0.880 g/cc; and/or (ii) a MI from 3 g/10 min to 20 g/10 min; and/or (iii) a Tm from 50° C. to 60° C.; and/or (iv) Tg from −60° C. to −50° C.; and/or (v) a Vicat softening point from 30° C. to 40° C.;

(C) from 12 wt % to 18 wt % of the propylene elastomer, the propylene elastomer having (i) a density from 0.860 g/cc to 0.890 g/cc or from 0.860 g/cc to 0.880 g/cc; and/or (ii) a MFR from 15 g/10 min to 30 g/10 min; and/or (iii) a Tm from 60° C. to 90° C.; and/or (iv) a Vicat softening point from 45° C. to 55° C.;

(D) from 8 wt % to 12 wt % of the filler; and (E) from 0.1 wt % to 0.5 wt % antioxidant, the sum of components (A)-(E) amount to 100 wt % of the foam article and the foam article has one, some, or all of the following properties:

(1) a density from 0.810 g/cc to 0.850 g/cc, or from 0.810 g/cc to 0.840 g/cc; and/or (2) a notched Izod impact strength at 23° C. from greater than 11 KJ/m$^2$ to 27 KJ/m$^2$; and/or (3) a notched Izod impact strength at −30° C. from 2.5 to 4.0 KJ/m$^2$; and/or (4) a flexural modulus from greater than 600 MPa to less than 1100 MPa; and/or (5) is crosslink-free (no gel content); and/or (6) is void of, or otherwise excludes, silane or silicon (hereafter Foam3).

The foam article (Foam1 and/or Foam2 and/or Foam3) formed from the present foamable composition can be an extruded sheet, rod, plank, films and profiles. In an embodiment, the foam article (Foam1 and/or Foam2) formed from the present foamable composition is used in automotive interior parts. Nonlimiting examples of automotive interior parts for which the foam article (Foam1 and/or Foam2 and/or Foam3) is a component include a door panel, a steering wheel, a seat, a dashboard, an instrument panel, a glovebox, a center console, an interior trim part, and combinations thereof.

In an embodiment, the present disclosure provides a vehicle, such as a car or a truck, comprising a foamed article (Foam1 and/or Foam2 and/or Foam3) formed from the present foamable composition.

By way of example, and not limitation, some embodiments of the present disclosure are described in detail in the following examples.

EXAMPLES

The raw materials for use in the Inventive Examples ("IE") and Comparative Samples ("CS") are detailed in Table 1 below.

TABLE 1

| Materials | | |
|---|---|---|
| Commercial Name | Composition/Properties | Source |
| BX 3900 | Propylene impact copolymer Ethylene/propylene rubber: 10.8 wt % Density: 0.90 g/cc, MFR: 60 g/10 min Vicat softening point: 155° C. | SK Global Chemical Company |
| ENGAGE 8200 | EPE- Ethylene/octene copolymer Density: 0.870 g/cc, MI: 5.0 g/10 min Tm: 59.0° C. Vicat softening temperature: 37.0° C. Tg: −53.0° C. | Dow, Inc. |
| ENGAGE 8137 | EPE--Ethylene/octene copolymer Density: 0.864 g/cc, MI: 13 g/10 min Tm: 56° C. Tg −55° C. | |
| VERSIFY 4200 | PBE--Propylene/ethylene copolymer Ethylene: 8.3 wt % Density: 0.86 g/cc MFR: 25 g/10 min | Dow, Inc. |

TABLE 1-continued

| Materials | | |
|---|---|---|
| Commercial Name | Composition/Properties | Source |
| VERSIFY 4301 | Tm: 84° C.<br>Vicat softening temperature: 61° C.<br>PBE-- Propylene/ethylene copolymer<br>Ethylene: 11.4 wt %<br>Density: 0.868 g/cc,<br>MFR: 25 g/10 min | Dow, Inc. |
| JetFil 700 | Tm: 64° C.<br>Vicat softening temperature: 51.0° C.<br>Talc<br>Median particle size: 1.5 microns | Imery |
| Irganox B225 | Antioxidant -- organophosphite. | BASF |
| Hydrocel J001 | Blowing agent -- NaHCO$_3$ | Clariant |
| Polythlene EE25C | Blowing agent -- NaHCO$_3$ | Ewai Chemical Company |

Foam Preparation

Each component is weighed the components were extruded (except foaming agent) using Coperon 18 mm extruder. The polymeric material was granulated into small pellets by side cutter granulator to form TPO pellets. The TPO pellets were dry blended with foaming agent. The dry TPO pellet blends were injection molded in FANUC S-2000I B series injection molding with 28 mm diameter. The profile temperature was set at 200° C. and mold temperature was set at 95° C. A "two times" mold opening molding operation was applied, starting with a 1 mm opening distance for foaming space, as shown in FIGS. 1(a), 1(b), and 1(c).

Applicant discovered that the addition of propylene elastomer (Versify 4200 and/or Versify 4301) to TPO formulations achieves a foam article with an unexpected balance of toughness (Notch Izod 23° C. from greater than 11 KJ/m$^2$ to 27 KJ/m$^2$; and stiffness (flexural modulus from greater than 600 MPa to less than 1100 MPa).

It is specifically intended that the present disclosure not be limited to the embodiments and illustrations contained herein, but include modified forms of those embodiments including portions of the embodiments and combinations of elements of different embodiments as come within the scope of the following claims.

TABLE 2

| Formulations for foamable composition and properties for resultant foam article. | | | | | | |
|---|---|---|---|---|---|---|
| Formulation | CS-1 | IE-2 | IE-3 | CS-4 | IE-5 | IE-6 |
| BX 3900 | 70 | 59 | 59 | 70 | 59 | 59 |
| ENGAGE 8200 | 20 | 16 | 16 | | | |
| ENGAGE 8137 | | | | 20 | 16 | 16 |
| Versify 4200 | | 15 | | | 15 | |
| Versify 4301 | | | 15 | | | 15 |
| JetFil 700 | 10 | 10 | 10 | 10 | 10 | 10 |
| Irganox B225 | 0.3 | 0.3 | 0.3 | 0.3 | 0.3 | 0.3 |
| Properties*† | | | | | | |
| Density (g/cc) | 0.838, 0.825 | 0.832, 0.838 | 0.829, 0.818 | 0.837, 0.806 | 0.838, 0.801 | 0.818, 0.801 |
| Foam ratio (%) | 15, 17 | 15, 14 | 15, 17 | 14, 18 | 13, 18 | 15, 18 |
| Pore size (microns) | 457, 135 | 414, 109, | 348, 173 | 304, 101 | 307, 129 | 340, 113 |
| Flex (Young's) Mod (MPa) | 1143, 1261 | 954, 1052 | 913, 998 | 1109, 1149 | 928, 1023 | 868, 982 |
| Flex Yield Strength (MPa) | 22, 23 | 19, 19 | 18, 17 | 21, 21 | 19, 18, | 17, 17 |
| Tensile Mod (MPa) | 1070, 1050 | 725, 695 | 614, 625 | 689, 979 | 681, 601 | 642, 581 |
| Tensile Yield Strength (MPa) | 15.1, 13.9 | 13.3, 12.7 | 12.6, 11.7 | 13.2, 13.7 | 13.0, 12.2 | 12.1, 11.2 |
| Tensile elongation (%) | 23.5, 33.2 | 49.0, 68.2 | 41.8, 55.6 | 36.3, 40.7 | 33.2, 65.9 | 37.7, 53.1 |
| Notched Izod 23° C. | 10.4, 10.1 | 14.7, 11.7 | 18.5, 16.0 | 13.7, 9.1 | 18.9, 11.8 | 26.4, 15.6 |
| Notched Izod −30° C. | 3.4, 3.4 | 2.8, 3.1 | 3.0, 3.4 | 3.5, 3.3 | 3.2, 2.7 | 4.0, 3.6 |

Properties--for each formulation, two foam compositions with different foaming agents were produced
*first value for each property is for foam composition made with 1.5 wt % Hydrocel J001 foaming agent
†second value for each property is for foam composition made with 4 wt % Ewai EE25C foaming agent
CS—comparative sample
IE—inventive example

The invention claimed is:

1. A foam article consisting of:

(A) from 55 wt % to 65 wt % of a propylene impact copolymer comprising (i) from 8 wt % to 11 wt % of an ethylene/propylene rubber phase, (ii) a density from 0.89 g/cc to 0.91 g/cc, (iii) a melt flow rate from 50 g/10 min to 70 g/10 min, and (iv) a Vicat softening point from 150° C. to 170° C.;

(B) from 12 wt % to 18 wt % of an ethylene elastomer with (i) a density from 0.860 g/cc to 0.89 g/cc, (ii) a melt index from 4 g/10 min to 15 g/10 min, (iii) a melting point from 50° C. to 60° C., (iv) a glass transition temperature from –60° C. to –50° C., and (v) a Vicat softening point from 30° C. to 40° C.;

(C) from 12 wt % to 18 wt % of a propylene elastomer consisting of propylene and from 7 wt % to 13 wt % ethylene comonomer and having (i) a density from 0.860 g/cc to 0.890 g/cc, (ii) a melt flow rate from 15 g/10 min to 50 g/10 min, and (iii) a melting point from 60° C. to 90° C.;

(D) from 8 wt % to 12 wt % of a filler selected from the group consisting of talc, calcium carbonate, mica, glass fibers, and combinations thereof; and (E) from 0.1 wt % to 0.5 wt % of an antioxidant;

the foam article having (1) a density from 0.80 g/cc to 0.84 g/cc;

(2) a notched Izod impact strength at 23° C. from greater than 11 KJ/m$^2$ to 27 KJ/m$^2$;

(3) a notched Izod impact strength at –30° C. from 2.5 to 4.0 KJ/m$^2$; and (4) a Young's modulus from greater than 600 MPa to less than 1100 MPa.

2. The foam article of claim 1 wherein the propylene elastomer has (iv) a Vicat softening point from 45° C. to 55° C.

3. The foam article of claim 1 wherein the propylene impact copolymer is in amount of from 55 wt % to 60 wt %.

4. The foam article of claim 1 wherein the foam article is (5) crosslink-free; and (6) void of silicon.

5. The foam article of claim 1, wherein the foam article is an automotive interior part selected from the group consisting of a door panel, a steering wheel, a seat, a dashboard, an instrument panel, a glovebox, a center console, an interior trim part, and combinations thereof.

\* \* \* \* \*